United States Patent [19]

Eschner et al.

[11] Patent Number: 4,564,485
[45] Date of Patent: * Jan. 14, 1986

[54] PROCESS FOR PRODUCING A PLASTIC COMPOSITION WHICH CAN BE PROCESSED INTO A FIRE-RESISTANT MATERIAL

[75] Inventors: Axel Eschner, Wiesbaden; Rudolf Ganz, Mainz-Gonsenheim; Günter Tkotz, Wiesbaden; Hermann Stein, Bad Durkheim; Klaus Kreuels, Eltville, all of Fed. Rep. of Germany

[73] Assignee: Didier-Werke AG, Wiesbaden, Fed. Rep. of Germany

[*] Notice: The portion of the term of this patent subsequent to Mar. 13, 2001 has been disclaimed.

[21] Appl. No.: 349,244

[22] Filed: Feb. 16, 1982

[30] Foreign Application Priority Data

Feb. 16, 1981 [DE] Fed. Rep. of Germany ....... 3105593

[51] Int. Cl.$^4$ ........................... B28B 21/52; B28C 5/40
[52] U.S. Cl. .................................... 264/30; 106/18.14; 264/60; 264/63; 264/125; 264/171; 264/176 R
[58] Field of Search ..................... 264/63, 30, 60, 171, 264/125, 176 R; 106/18.14

[56] References Cited

U.S. PATENT DOCUMENTS

| | | | |
|---|---|---|---|
| 3,014,835 | 12/1961 | Feigley | 264/86 |
| 3,016,598 | 1/1962 | Anderson | 264/62 |
| 3,231,401 | 1/1966 | Price | 264/63 |
| 3,250,833 | 5/1966 | Wagner | 264/86 |
| 3,357,842 | 12/1967 | Bowman | 264/30 |
| 3,549,473 | 12/1970 | Le Blanc | 264/63 |
| 3,859,405 | 1/1975 | Horton | 264/63 |
| 3,899,555 | 8/1975 | Takao | 264/86 |
| 4,436,680 | 3/1984 | Eschner et al. | 264/60 |

*Primary Examiner*—Jeffery Thurlow
*Attorney, Agent, or Firm*—Wenderoth, Lind & Ponack

[57] ABSTRACT

Plastic composition which can be processed into a fire-resistant material, use thereof, and process for its production, which process comprises mixing ceramic fibers with a substantially dry organic bonding agent to produce a first mixture, mixing the first mixture with water to produce a second mixture, mixing the second mixture with clay to produce a third mixture, and mixing the third mixture with an aqueous solution of an organic bonding agent to produce a fourth mixture, with the proviso that the ceramic fibers account for at least 74% by weight of the solids content in the plastic composition.

32 Claims, No Drawings

PROCESS FOR PRODUCING A PLASTIC COMPOSITION WHICH CAN BE PROCESSED INTO A FIRE-RESISTANT MATERIAL

BACKGROUND OF THE INVENTION

The present invention relates to a process for producing a plastic composition which can be processed into a fire-resistant material, more particularly, a composition containing ceramic fibers, organic bonding agent, water and clay.

The present invention also relates to the composition produced by this process, and the use of the composition in applications where fire-resistance is desired.

The art is aware of heat-insulating, ceramic fiber bodies, made of fire-resistant or fire-proof fibers and organic or inorganic bonding agents, having low stability and high compressibility, or having increased stability, density and nondeformability. For example, German Patent Specification DE-AS No. 12 74 490 describes a combustion chamber for furnaces, constructed by shaping a composition containing fibers and bonding agents, in such a manner that the concentration of bonding agent varies across the cross-section of the furnace wall. This reference mentions different types of clay, alkali-silicates, aluminum phosphates and colloidal siliceous earth, in an amount of 5 to 35% (optimum of 10%) by weight, as suitable bonding agents. However, such fiber bodies are not sufficiently suited for application of high stress, since one wall surface is dense and hard, and the other, opposite, wall surface is soft and flexible.

Another German Patent Specification, DE-AS No. 27 32 387, discloses a process wherein a mineral fiberboard, which has been hardened in advance with an organic synthetic bonding agent, is soaked in an aqueous solution of a bonding clay and subsequently hardened through tempering.

Furthermore, DE-AS No. 26 18 813 discloses fiber spraying-compositions which contain, in addition to a large amount of inorganic fibers, a small amount of bonding agent and/or inorganic components as well as an additional chemical bonding agent. These fiber spraying-compositions also contain 5 to 20% by weight of an oil, to avoid dust formation. Instructions for use of these fiber spraying-compositions expressly indicate that the inorganic fibers, such as rock wool, have to be used in a loosened condition.

It is also known that, to increase the density of the ceramic fibers, clay or other finely dispersed refractory materials can be added to the fibers, along with the usual bonding agents and the required quantity of water, in order to obtain compositions which, after processing into fire-resistant or fire-proof materials, have a higher density than the compositions containing only the ceramic fibers, bonding agent and water.

The art is also aware of the fact that products containing ceramic fibers can be manufactured by a vacuum suction process, as boards and moldings having densities of about 0.2 g/ml. For this purpose, the ceramic fibers and bonding agent, such as starch, colloidal silicic acid or a phosphate such as mono-aluminum phosphate or sodium polyphosphate, are sucked onto a screen surface in the form of a suspension containing about 1 to 5% by weight of the fibers. To achieve higher densities, and thus give special properties to the moldings manufactured by the vacuum suction process, other fillers can also be used, such as fire clay, alumina, silicon carbide or clays such as bentonite. However, there is a disadvantage in manufacturing moldings by the vacuum suction process, in that the bonding agent is present in the form of an aqueous solution or suspension, and the greater part of the bonding agent is removed with the water when the water is evacuated, meaning that if soluble phosphates are used, problems of waste water disposal are created. Additionally, the presence of other refractory fillers means that the density of the product decreases with increasing distance from the suction or screen surface used in molding, so that, especially with products having a large wall thickness, there are severe fluctuations in density throughout the cross-section of the wall.

It has been shown that the strength properties of a product, such as its compression strength, tensile strength, hot bending strength and resistance to abrasion, are improved with increasing density of the product. With vacuum-molded products, and also with products manufactured by previously known mixing methods, an increase in the density can only be achieved by adding larger amounts of fillers, such as standard clay or fire clay. However, this means that a molding composition containing, for example, 50% by weight of ceramic fibers and 50% by weight of fillers, will have a higher heat conductivity than a material containing a higher proportion of insulating ceramic fibers, so that the advantageous properties of the molding composition are not realized.

SUMMARY OF THE INVENTION

The object of the present invention is to provide a plastic composition which can be processed into a fire-resistant (or fire-proof) material, more specifically, a fire-resistant material having a density of about 0.3 to 1.6 g/cm$^3$, preferably 0.4 to 0.8 g/cm$^3$, wherein the fire-resistant material, after drying, i.e. after the removal of water contained in the plastic composition, contains at least 74% by weight, preferably at least 80% by weight, of the ceramic fibers, and which, therefore, has a sufficiently high density for the intended uses.

It is also an object of the invention to provide a process for producing such plastic composition.

Another object of the invention is to provide processes of using the plastic composition, for applications in which fire-resistance is desired, for example, processing the composition into moldings which do not exhibit the decrease in density experienced with the fiber moldings produced by the above-mentioned vacuum suction process.

These objects are accomplished, in accordance with the present invention, by a process which comprises mixing ceramic fibers with a substantially dry organic bonding agent to produce a substantially uniformly dispersed first mixture, mixing said first mixture with water to produce a substantially uniformly dispersed second mixture, mixing said second mixture with clay to produce a substantially uniformly dispersed third mixture, and mixing said third mixture with an aqueous solution of an organic bonding agent to produce a substantially uniformly dispersed fourth mixture, with the proviso that at least 74% by weight of the solids content in said plastic composition is accounted for by said ceramic fibers.

DETAILED DESCRIPTION OF THE INVENTION

More specifically, the process for producing a plastic composition which can be processed into a fire-resistant material, in accordance with the present invention, comprises mixing 100 parts by weight of ceramic fibers with 1 to 3 parts by weight of a substantially dry organic bonding agent to produce a substantially uniformly dispersed first mixture; mixing said first mixture with 10 to 50 parts by weight of water to produce a substantially uniformly dispersed second mixture; mixing said second mixture with 10 to 30 parts by weight of clay to produce a substantially uniformly dispersed third mixture; and mixing said third mixture with an aqueous solution of 1 to 3 parts by weight of an organic bonding agent to produce a substantially uniformly dispersed fourth mixture; with the proviso that at least 74% by weight of the solids content in said plastic composition is said ceramic fibers.

Preferably, in producing the second mixture, the water is sprayed on the first mixture while the first mixture is being mixed in a mixer.

Another feature of the present invention is that, in preparing the third mixture, 1 to 5 parts by weight of an inorganic bonding agent, in solid form, are added to the second mixture. In a preferred aspect of the invention, the inorganic bonding agent is mono-aluminum phosphate or sodium polyphosphate ($Na_{n+2}P_nO_{3n+1}$) having a polymerization degree (n) of, preferably, at least 4, more preferably, from 6 to 10.

In another feature of the invention, the aqueous solution used in producing the fourth mixture, in addition to containing the organic bonding agent, also contains 1 to 3 parts by weight of an inorganic bonding agent dissolved therein. However, in this instance, the total amount of the inorganic and organic bonding agents in the aqueous solution is not greater than 5 parts by weight, calculated in terms of the solid bonding agents. In this feature of the invention, examples of the inorganic bonding agent are mono-aluminum phosphate and sodium polyphosphate, the same as indicated above.

Examples of the organic bonding agent which can be used in producing the first and fourth mixtures are methyl cellulose, starch, molasses and sulfite waster liquor. The same or different organic bonding agent can be employed in producing the first and fourth mixtures.

Methyl cellulose is the preferred organic bonding agent, especially in producing the fourth mixture.

Although specific examples of the inorganic and organic bonding agents have been given above, it is to be understood that the present invention is not limited thereto. Rather, any inorganic and organic bonding agent employed in this art can be used in the present invention.

The ceramic (or mineral) fibers employed in the present invention are conventional ceramic fibers such as rock wool or fibers of aluminum silicate containing 45 to 95% by weight of $Al_2O_3$, and are preferably no more than 10 mm in length. It is also possible to employ mixtures of different ceramic fibers.

Preferably, the ceramic fibers are employed as individual ceramic fibers, i.e. fibers which have been broken up to separate them from each other, rather than to use them in the form of, for example, fiber bundles, as will be explained in more detail below.

It is especially preferable if the ceramic fibers are used in chopped form, i.e. with a length of 1 to 5 mm, although it is also possible to use so-called ground fibers, having a length of 10 to 500 $\mu$m.

The diameter of the ceramic fibers is generally about 1 to 25 $\mu$m, preferably 2 to 8 $\mu$m.

However, it is of course also possible to use ceramic fibers having dimensions other than those indicated above.

The clay employed in the present invention can be a standard clay or a special bonding clay, both types being well known to those in the art. Preferably, bentonite is employed as the clay.

In accordance with another feature of the present invention, the third mixture can be mixed with up to 20 parts by weight, preferably up to 5 parts by weight, of a refractory material other than the clay used in producing the third mixture. These refractory materials preferably have a maximum particle size of about 8 mm, more preferably about 3 mm. Particularly recommended is a particle size of 2 mm.

Examples of the refractory material are granular refractory materials such as fire clay and calcined bauxite. It is also possible to employ finely dispersed refractory materials such as $Al_2O_3$ (especially, high-purity $Al_2O_3$) and/or $SiO_2$ and/or aluminum hydroxide and/or bauxite and/or magnesium oxide and/or titanium dioxide and/or chromium oxide, all of which are components which have long been used to improve refractory qualities.

The expression "finely dispersed" as employed above means that these components are pulverized or in a colloidal condition. In particular, it includes colloidal components such as colloidal $SiO_2$ and/or colloidal $Al_2O_3$.

An especially preferred refractory material is hollow spheres of corundum.

In another particularly advantageous feature of the invention, up to 100 parts by weight of a granular refractory material, the individual granules of which contain ceramic fibers, are mixed with the third mixture. This higher amount of refractory material is possible since the granules themselves contain ceramic fibers as their principal component. As with the other refractory materials discussed above, these granular refractory materials are mixed with the third mixture after the clay, and, optionally, the solid inorganic bonding agent, have been thoroughly mixed with the second mixture.

The granular refractory materials, the individual granules of which contain ceramic fibers, are novel, and are described in three separate U.S. patent applications filed on the same day as the present application, which three U.S. applications are Ser. No. 349,247, now U.S. Pat. No. 4,436,680; Ser. Nos. 349,243 now abandoned and 349,242, now abandoned respectively based on German Patent Applications Nos. P 31 05 579.6, P 31 05 530.3 and P 31 05 531.1, all filed Feb. 16, 1981.

In accordance with one of these applications, the granular refractory material, which can be employed in the process of the present invention, is prepared by mixing 100 parts by weight of ceramic fibers, 2 to 15 parts by weight of at least one member selected from the group consisting of clay, $Al_2O_3$, $SiO_2$, aluminum hydroxide, magnesium oxide, titanium dioxide and chromium oxide, 1 to 8 parts by weight, as $P_2O_5$, of a phosphate bonding agent, and about 2 to about 25 parts by weight of water, to form a substantially uniformly dispersed mixture; compacting said mixture by a volume coefficient of at least 3; subjecting said compacted mixture to at least one heat-treatment selected from the group consisting of drying at 110° to 180° C., heat-treating at 250° to 600° C., and firing at 800° to 1550° C.; and granulating the thus heated product. Optionally, up to 10 parts by weight of another refractory material, such as powdered porcelain, and/or 1 to 10 parts by weight of a plasticizer, such as methyl cellulose, can be incorporated in the uniformly dispersed mixture.

In accordance with another of these applications, the granular refractory material is prepared by mixing 100 parts by weight of ceramic fibers with 10 to 40 parts by weight of water to produce a substantially uniformly dispersed first mixture; mixing said first mixture with 5 to 20 parts by weight of at least one refractory component selected from the group consisting of clay, $Al_2O_3$, $SiO_2$, aluminum hydroxide, magnesium oxide, titanium dioxide and chromium oxide, to produce a substantially uniformly dispersed second mixture; mixing said second mixture with 1 to 8 parts by weight, as $P_2O_5$, of a phosphate bonding agent, and an aqueous solution of 0.5 to 4 parts by weight of an organic bonding agent, to produce a substantially uniformly dispersed third mixture; drying said third mixture at a temperature above 100° C.; and granulating the dried third mixture. Optionally, up to 10 parts by weight of a solid organic bonding agent, such as methyl cellulose, can be mixed with said first mixture in preparing said second mixture. Methyl cellulose can also be used as the organic bonding agent used in preparing the aqueous solution mixed with said second mixture.

In accordance with the third application, the granular refractory material is prepared by mixing 100 parts by weight of ceramic fibers, 2 to 15 parts by weight of at least one member selected from the group consisting of clay, $Al_2O_3$, $SiO_2$, aluminum hydroxide, magnesium oxide, titanium dioxide and chromium oxide, 1 to 10 parts by weight of an organic bonding agent, and about 5 to about 25 parts by weight of water, to form a substantially uniformly dispersed mixture; compacting said mixture by a volume coefficient of at least 3; drying said compacted mixture; and granulating the thus dried mixture. Optionally, up to 10 parts by weight of another refractory material, such as powdered porcelain, can be incorporated in the uniformly dispersed mixture.

Specific working examples for preparing the granular refractory materials in accordance with each of these applications are set forth below.

In the first step of the process of the present invention, 100 parts by weight of the ceramic fibers are mixed with 1 to 3 parts by weight of a substantially dry organic bonding agent to produce the substantially uniformly dispersed first mixture. For this purpose, preferably the ceramic fibers are broken up, i.e. separated from each other. To accomplish this, commercially available fibers, which can be obtained as clumps of fibers, can be ground in a mill, preferably a hammer mill or an impact pulverizer, to form a free-flowing product. The amount of time necessary to accomplish this will depend on the mill which is used, the ceramic fiber material and its dimensions. Generally, the grinding time is from 10 minutes to 1 hour.

The substantially dry organic bonding agent can be added to the ceramic fibers before or while they are being separated from each other, or can be added to the fibers after they have been separated from each other. Mixing is then continued until the substantially uniformly dispersed first mixture is produced.

It is also possible to break up or separate the fibers from each other, mechanically, without grinding or crushing them as indicated above. To accomplish this, cards such as those used in the textile industry can be employed. The fiber flocks are broken up or separated on the cards, also resulting in removal of any impurities.

In the second step of the process, the first mixture is mixed with 10 to 50 parts by weight of water to produce the substantially uniformly dispersed second mixture. For some applications, the use of 20 to 40 parts by weight of water is preferred, while for other applications, it may be preferable to use 15 to 30 parts by weight of water.

In a preferred aspect of the process, the fibers which have been separated from each other in the mill or on the cards, are transferred into an appropriate mixing apparatus, for example, a Drais Mixer, and are then sprayed with the water while being mixed therein.

In the third step, the second mixture is mixed with 10 to 30 parts by weight, preferably 10 to 20 parts by weight, of clay to produce the substantially uniformly dispersed third mixture. Optionally, a solid inorganic bonding agent, preferably in an amount of 1 to 5 parts by weight, can also be used in forming the third mixture.

Preferably, in forming the third mixture, the clay is added in portions to the second mixture in the Drais Mixer, and is mixed therein over a period of, preferably, up to 30 minutes, more preferably, for 15 minutes.

In still another preferred aspect of the present invention, in preparing the third mixture, after the clay is thoroughly mixed in with the second mixture, another refractory material is mixed with the resultant mixture. The other refractory material is used in an amount of up to 20 parts by weight, preferably up to 10 parts by weight. However, the total amount of clay and other refractory material used in preparing the third mixture is limited in a manner such that the plastic composition, produced as the final product of the process, will contain at least 74% by weight of the ceramic fibers, based on the weight of the solids in the composition, i.e. discounting the water in the composition.

Thus, in preparing the third mixture, the clay and other components which have been previously added are thoroughly mixed with the ceramic fibers. This causes the clay to adhere to the fibers and form a polished, smoothly striated surface on the fibers.

In the next step of the process, the third mixture is mixed with an aqueous solution of 1 to 3 parts by weight of an organic bonding agent to produce the substantially uniformly dispersed fourth mixture. Preferably, this aqueous solution has the consistency of syrup, and preferably methyl cellulose is used as the organic bonding agent. As indicated above, it is also possible to incorporate 1 to 3 parts by weight of an inorganic bonding agent in the aqueous solution, with the proviso that the total amount of the inorganic and organic bonding agents in the aqueous solution is not greater than 5 parts by weight, calculated as solids. As indicated above, inorganic bonding agents which can be used include mono-aluminum phosphate and sodium polyphosphate.

In each mixing step of the process, mixing is carried out until a substantially uniformly dispersed mixture is obtained. Preferably, each mixing step is carried out for up to 1 hour, for example, for from about 10 minutes to 1 hour.

After the final mixing step, i.e. after the fourth mixture has been produced, the resultant plastic composition can be stored as it is, or can be immediately processed, for example, on an extrusion press. For storage, the plastic composition can be placed in a suitable closed container, and can be stored for a long period of time, for subsequent delivery to the consumer.

The plastic composition produced in accordance with the present process is particularly advantageous for use in manufacturing moldings such as tubes and rods produced in extrusion presses, which would not be possible with vacuum molding. In addition, tubes with a square or rectangular cross-section can be produced by extrusion presses.

Another advantageous application of the plastic composition produced by the present process lies in the fact that it can be produced in the form of clumps, for example, by extrusion presses, and packaged in sheets of plastic, for further processing. Such clumps can, if they have been manufactured by using an extrusion press, have any desired length. The clumps can be removed from the plastic sheets at the place where they are to be used, and can be molded by pressing or stamping, or can be used to manufacture any desired moldings or structural components, for example, for walls.

The moldings manufactured from the plastic compositions of the present invention can be dried, preferably at a temperature of 110° to 200° C., and this results in a solid product which rings when struck with a metal object. Furthermore, after firing the dried moldings, for example at 900° C. (generally 800° to 1550 C.), the bending strength of the molding is about 2 $N/mm^2$. Normally, moldings with the same content of ceramic fibers, produced by other known processes, have bending strengths of only 0.1 to 0.3 $N/mm^2$.

The plastic compositions of the present invention can be packaged as thin sheets, in plastic sheets, such thin sheets, having a thickness of, for example, 2 to 10 mm, preferably 4 to 6 mm, packaged in plastic sheets, can be used to fill expansion joints formed in the linings of furnaces, for example, cylindrical rotary furnaces. Such thin sheets of the plastic composition of the present invention, packaged in plastic sheets, can be placed between the bricks when the bricks are being installed for the lining of the furnace. When the furnace is started up, the plastic sheets are burned up, and the plastic composition of the present invention, present in an appropriate thickness in the expansion joints, is fired, acting just like asbestos inserts. As a result of the high amount of ceramic fibers in the composition, it exhibits a desirable degree of elasticity, but is not dangerous to human health, as asbestos is.

In an especially preferred aspect, clumps having dimensions of, for example, 300 mm × 300 mm, of any desirable length, are manufactured from the plastic composition, preferably in an extrusion press, and are then packaged, ready for processing, in sheets which are water-resistant or water-proof.

As indicated above, using the plastic composition of the present invention, for example in the form of clumps, by pressing or stamping, any desired molding or wall components can be manufactured, or the composition can be used to fill expansion joints. In addition, it is also possible to pre-fire the clumps, for example at 900° C., and then to cut moldings from them, for example, for industrial furnaces. Such pre-firing has the advantage that contraction due to temperature shock is avoided.

A special advantage of the plastic compositions lies in the fact that they are suitable for drawing into thin tubes down to a thickness of 5 mm, which is not possible with previously known plastic compositions, or processible suspensions of ceramic fibers using the vacuum suction process.

The following examples illustrate the present invention.

EXAMPLE 1

Commercial ceramic fibers having an $Al_2O_3$ content of 47% by weight, the remainder $SiO_2$, were used. These ceramic fibers have a diameter of 3–5 μm, and a length of 5 mm.

100 parts by weight of the ceramic fibers were broken up in a turbo-equipped Eirich Mixer. After 15 minutes, 2 parts by weight of solid methyl cellulose were added, and mixed for another 15 minutes. The mixture was then sprayed with 20 parts by weight of water. Then, 20 parts by weight of bentonite were added in portions, specifically in portions of 4 parts by weight over 2 minutes, and then mixing was continued for 2 minutes without the further addition of clay. The result was the formation of a polished and smoothly striated coating of clay on the fibers.

Next, the mixture obtained in this manner was mixed with approximately 50 parts by weight of a 5% methyl cellulose solution, slowly added over 15 minutes and mixed for another 10 minutes. This produced a composition suitable for extrusion molding. From it, tubes with an inside diameter of 50 mm and a wall thickness of 8 mm were extrusion-molded, which, after 8 hours of drying at 130° C., had a density of about 0.7 $g/cm^3$. The tubes were fired for 2 hours at 1350° C.; their bending strength was about 9 $N/mm^2$.

EXAMPLE 2

The procedure of Example 1 was repeated, but in the stage where the clay is mixed in, 2 parts by weight of solid, finely ground mono-aluminum phosphate were also added.

A plastic composition was produced which was particularly well-suited for extrusion molding into tubes with thin walls.

EXAMPLE 3

The procedure of Example 1 was repeated, but only 15 parts by weight of clay were used; and also, the 5% methyl cellulose solution which was used also contained 2 wt.% dissolved sodium polyphosphate.

The plastic composition obtained in this manner also was particularly well-suited for extrusion molding into tubes with thin walls.

EXAMPLE 4

The procedure of Example 3 was repeated, but 5 parts by weight of granulated fire clay with a maximum particle size of 2 mm were added after the bentonite was mixed.

A plastic composition was obtained which was particularly well-suited for extrusion molding to form a length with the dimensions 300 mm × 300 mm. Clumps 50 mm long were cut off and packaged in PVC film. They had a storage life of more than 150 days.

EXAMPLE 5

The procedure of Example 1 was repeated, but after the clay was mixed, 100 parts by weight of the fiber granulate (a) described below, which had been fired at 1350° C., and which had a maximum grain size of 3 mm, were added, and mixed for another 3 minutes. This composition was then mixed with 70 parts by weight of a 5 wt.% methyl cellulose solution, which contained 3 wt.% of mono-aluminum phosphate dissolved therein.

The resultant plastic composition was then shaped in an extrusion press into clumps with the dimensions 300×210×70 mm. These clumps were packaged in plastic film, which resulted in a consumer product which could be stored.

EXAMPLE 6

The procedure of Example 5 was repeated, but instead of the 100 parts by weight of fiber granulate (a), either 20 parts by weight of granulated fire clay with an $Al_2O_3$ content of 30%, or 20 parts by weight of hollow corundum spheres having a particle size less than 3 mm, were added.

Clumps were also produced in this manner.

The contraction during drying, contraction during firing for 24 hours at 1400° C., and the bulk density (R) in the fired state were determined for the clumps manufactured in Examples 5 and 6. The values determined in this manner are set forth in the following table.

| Ex. | Additives | Contraction during drying (%) | Contraction during drying (%) | R (g/cm$^3$) |
|---|---|---|---|---|
| 1 | none | 1.3 | 3.5 | 1.10 |
| 5 | 100 parts by weight fiber granulate a | 0.21 | 1.2 | 1.13 |
| 6a | 20 parts by weight granulated fine clay | 0.43 | 2.0 | 1.42 |
| 6b | 20 parts by weight hollow corundum spheres | 0.65 | 2.2 | 1.33 |

From this table it is apparent that by adding a fiber granulate, the contraction during drying can be decreased very significantly, although the material obtained has a higher proportion of ceramic fibers than the compositions according to Example 6.

Processes for producing the granular refractory material, the individual granules of which contain ceramic fibers, in accordance with the three U.S. applications previously referred to, will now be described by reference to the following working examples. In these examples, two types of ceramic fibers are employed, namely:

(A) ceramic fibers of the $Al_2O_3$—$SiO_2$ group, containing 47% by weight of $Al_2O_3$ and 53% by weight of $SiO_2$, having a temperature limit of 1260° C., and (B) ceramic fibers of the $Al_2O_3$—$SiO_2$ group, containing 95% by weight of $Al_2O_3$ and 5% by weight of $SiO_2$, having a higher temperature limit, above 1500° C.

Fiber Granulate a 100 parts by weight of ceramic fibers A, 10 parts by weight of bonding clay with an $Al_2O_3$ content of 35% by weight and 1.5 parts by weight of dry, pulverized methyl cellulose were placed into an Eirich Mixer and thoroughly mixed for about 10 minutes. Subsequently, 10 parts by weight of a mono-aluminum phosphate solution (50% by weight) and 2 parts by weight of water were sprayed onto the material inside the continuously rotating mixer and mixed in for another 30 minutes.

Following removal from the mixer, the resulting product was compacted in a plate press, at an applied pressure of 30 N/mm$^2$, and turned into a plate-shaped product with a thickness of 30 mm. The compacting coefficient was 5.5.

The resulting plate-shaped product was subsequently dried in a furnace for 24 hours at 110° C., fired for 24 hours at the temperatures shown below, and then crushed to a maximum grain size of 3 mm.

| The granular product had the following properties: | | | |
|---|---|---|---|
| Firing temperature (°C.) | 800 | 1350 | 1510 |
| Grain weight per unit volume (g/cm$^3$) | 1.34 | 1.52 | 1.77 |
| Specific weight (g/cm$^3$) | 2.60 | 2.70 | 2.75 |
| Pore volume (vol. %)[1] | 47.7 | 43.7 | 35.6 |
| Chemical Analysis (%) | $Al_2O_3$ | 44.7 | |
| | $SiO_2$ | 50.7 | |
| | $P_2O_5$ | 2.95 | |

Note 1:
Pore volume (%) = $\frac{\text{specific weight} - \text{grain weight}}{\text{specific weight}} \times 100$

Fiber Granulate b

The following formulas were used, the amounts being in parts by weight:

| | Example 1 | Example 2 |
|---|---|---|
| Fibers A | 100 | 100 |
| H$_2$O | 30 | 15 |
| Bentonite | 10 | — |
| Al$_2$O$_3$ | 5 | 5 |
| TiO$_2$ | — | 2 |
| Methyl cellulose, solid | 4 | — |
| Sulfite waste liquor, solid | — | 5 |
| Sulfite waste liquor solution, 10 wt. % | — | 2 |
| Methyl cellulose solution, 5 wt. % | 0.5 | — |
| Mono-aluminum phosphate, solid | 4 | — |
| Sodium polyphosphate, solid | — | 2.5 |

First of all, the ceramic fibers were placed in an Eirich Mixer, and the indicated quantities of water were then sprayed on the fibers. Mixing was conducted for 10 minutes. Then the bentonite, the Al$_2$O$_3$ or TiO$_2$ and the solid methyl cellulose or the solid sulfite waste liquor were added and mixed for another 8 minutes. Then the indicated solutions of sulfite waste liquor or methyl cellulose were sprayed into the mixer, to which the finely dispersed solid phosphate bonding agent had been added, and mixed for another 10 minutes.

The crumbly mixture obtained was removed from the mixer.

The crumbly mixture was dried for 6 hours at 120° C., and then crushed in a roll crusher to a maximum grain size of 4 mm.

The properties of the products were as follows:

| | Example 1 | Example 2 |
|---|---|---|
| Bulk density, g/cm$^3$ | 0.22 | 0.14 |

Fiber Granulate c

The following formulas were used, the amounts being in parts by weight:

|  | Example | | | | |
|---|---|---|---|---|---|
|  | 1 | 2 | 3 | 4 | 5 |
| Ceramic fibers A | 100 | — | — | — | 50 |
| Ceramic fibers B | — | 100 | 100 | 100 | 50 |
| Binder clay (with 35% $Al_2O_3$) | 15 | 6 | — | 4 | — |
| Chromium oxide, particle size <63 μm | — | 4 | 4 | — | — |
| Colloidal $SiO_2$ | — | — | 6 | 2 | 4 |
| Colloidal $Al_2O_3$ | — | — | — | — | 6 |
| Methyl cellulose, solid | 6 | — | — | 4 | 1 |
| Sulfite waste liquor, solid | — | 7 | 2 | — | — |
| Fire clay powder | 2 | — | — | — | — |
| Water | 25 | 10 | 15 | 12 | 25 |

In an Eirich Mixer, the ceramic fibers were mixed with the binder clay and the other refractories for 5 minutes, and then the organic binders or binder mixtures were added, and finally the water. Mixing was conducted for a total of 20 minutes.

The mixture was compacted in a briquetting device (Manufacturer: KHD) at the volume coefficients indicated below, then dried for 12 hours at 120° C., and then crushed to a maximum grain size of about 6 mm. The properties of the granular product obtained were as follows:

|  | Example | | | | |
|---|---|---|---|---|---|
|  | 1 | 2 | 3 | 4 | 5 |
| Bulk density (g/cm$^3$) | 1.25 | 1.09 | 1.15 | 1.20 | 1.23 |
| Compacting coefficient | 5.4 | 7.2 | 6.8 | 6.0 | 6.5 |
| Pore volume (vol. %) | 49.5 | 69.7 | 68.0 | 53.8 | 62.6 |

We claim:

1. A process for producing a shaped plastic composition which can be processed into a fire-resistant material, which comprises:
    mixing 100 parts by weight of ceramic fibers with 1 to 3 parts by weight of a substantially dry organic bonding agent to produce a substantially uniformly dispersed first mixture,
    mixing said first mixture with 10 to 50 parts by weight of water to produce a substantially uniformly dispersed second mixture,
    mixing said second mixture with 10 to 20 parts by weight of clay and 1 to 5 parts by weight of a solid inorganic bonding agent to produce a substantially uniformly dispersed third mixture,
    mixing said third mixture with an aqueous solution of 1 to 3 parts by weight of an organic bonding agent to produce a substantially uniformly dispersed fourth mixture, and
    extrusion molding said fourth mixture to form said shaped plastic composition,
    with the proviso that at least 74% by weight of the solids content in said shaped plastic composition is said ceramic fibers.

2. A process according to claim 1, wherein said water is sprayed on said first mixture while said first mixture is being further mixed in a mixer, to produce said second mixture.

3. A process according to claim 1, wherein said inorganic bonding agent is mono-aluminum phosphate or sodium polyphosphate.

4. A process according to claim 1, wherein said organic bonding agent used in producing said fourth mixture is methyl cellulose.

5. A process according to claim 1, wherein said aqueous solution used in producing said fourth mixture further contains 1 to 3 parts by weight of an inorganic bonding agent dissolved therein, and the total amount of said inorganic and organic bonding agents in said aqueous solution is not greater than 5 parts by weight calculated as a solid.

6. A process according to claim 5, wherein said inorganic bonding agent is mono-aluminum phosphate or sodium polyphosphate.

7. A process according to claim 1, wherein 20 to 40 parts by weight of said water are used in producing said second mixture.

8. A process according to claim 1, wherein said clay is bentonite.

9. A process according to claim 1, further comprising mixing said third mixture with a positive amount of up to 20 parts by weight of a refractory material other than said clay used in producing said third mixture.

10. A process according to claim 9, wherein the maximum particle size of said refractory material is about 8 mm.

11. A process according to claim 9, wherein the maximum particle size of said refractory material is about 3 mm.

12. A process according to claim 9, wherein said refractory material is fire clay or hollow spheres of corundum.

13. A process according to claim 9, wherein said refractory material is at least one member selected from the group consisting of $Al_2O_3$, $SiO_2$, aluminum hydroxide, bauxite, magnesium oxide, titanium dioxide and chromium oxide.

14. A process according to claim 1, further comprising mixing said third mixture with a positive amount of up to 100 parts by weight of a granular refractory material the individual granules of which contain ceramic fibers.

15. A process according to claim 1, wherein said ceramic fibers are rock wool fibers or fibers of aluminum silicate containing 45 to 95% by weight of $Al_2O_3$.

16. A process according to claim 1, wherein said ceramic fibers have a length of 1 to 5 mm.

17. A process according to claim 1, wherein said ceramic fibers have a length of 10 to 500 μm.

18. A process according to claim 16 or 17, wherein said ceramic fibers have a diameter of 1 to 25 μm.

19. A process according to claim 18, wherein said ceramic fibers have a diameter of 2 to 8 μm.

20. A process according to claim 1, wherein said organic bonding agent used in producing said first and fourth mixtures is the same or different member selected from the group consisting of methyl cellulose, starch, molasses and sulfite waste liquor.

21. A process according to claim 1, wherein said aqueous solution of said organic bonding agent has the consistency of syrup.

22. A process according to claim 1, wherein said ceramic fibers are individual ceramic fibers which are separate from each other.

23. A process according to claim 1, wherein 15 to 30 parts by weight of said water are used in producing said second mixture.

24. A process according to claim 1, wherein each mixing step is carried out for up to 1 hour.

25. A process according to claim 1, wherein at least 80% by weight of the solids content in said plastic composition is said ceramic fibers.

26. A plastic composition produced in accordance with the process of either claim 1 or 5.

27. A plastic composition according to claim 26, in the form of workable clumps wrapped in a plastic sheet.

28. A process for producing a fire-resistant molding, which comprises:

mixing 100 parts by weight of ceramic fibers with 1 to 3 parts by weight of a substantially dry organic bonding agent to produce a substantially uniformly dispersed first mixture, mixing said first mixture with 10 to 50 parts by weight of water to produce a substantially uniformly dispersed second mixture, mixing said second mixture with 10 to 20 parts by weight of clay and 1 to 5 parts by weight of a solid inorganic bonding agent to produce a substantially uniformly dispersed third mixture, mixing said third mixture with an aqueous solution of 1 to 3 parts by weight of an organic bonding agent to produce a substantially uniformly dispersed fourth mixture, extrusion molding said fourth mixture to form a shaped plastic composition, and drying said shaped plastic composition, with the proviso that at least 74% by weight of the solids content in said shaped plastic composition, prior to drying, is said ceramic fibers.

29. A process according to claim 28, wherein said drying is carried out at 110° to 200° C.

30. A process according to claim 29, further comprising firing the dried product at 800° to 1550° C.

31. A process for producing an expansion joint in the lining of a furnace, which comprises packing the wrapped plastic composition of claim 27 in spaces between the members used in said lining.

32. A process according to claim 31, wherein said furnace is a cylindrical rotary furnace.

* * * * *